(12) United States Patent
Lai et al.

(10) Patent No.: US 7,683,142 B2
(45) Date of Patent: Mar. 23, 2010

(54) LATEX EMULSION POLYMERIZATIONS IN SPINNING DISC REACTORS OR ROTATING TUBULAR REACTORS

(75) Inventors: Zhen Lai, Webster, NY (US); Chieh-Min Cheng, Rochester, NY (US); Christopher M. Wolfe, Webster, NY (US); Mark A. Jackson, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 1027 days.

(21) Appl. No.: 11/247,321

(22) Filed: Oct. 11, 2005

(65) Prior Publication Data

US 2007/0082980 A1    Apr. 12, 2007

(51) Int. Cl.
C08F 2/01 (2006.01)
C08G 63/00 (2006.01)

(52) U.S. Cl. .............. 526/65; 526/64; 526/88; 422/134

(58) Field of Classification Search .......... 526/88, 526/64, 65; 422/134
See application file for complete search history.

(56) References Cited

U.S. PATENT DOCUMENTS

| | | | |
|---|---|---|---|
| 3,590,000 A | 6/1971 | Palermiti et al. | |
| 3,655,374 A | 4/1972 | Palermiti et al. | |
| 3,720,617 A | 3/1973 | Chatterji et al. | |
| 3,944,493 A | 3/1976 | Jadwin et al. | |
| 3,983,045 A | 9/1976 | Jugle et al. | |
| 4,007,293 A | 2/1977 | Mincer et al. | |
| 4,079,014 A | 3/1978 | Burness et al. | |
| 4,265,990 A | 5/1981 | Stolka et al. | |
| 4,394,430 A | 7/1983 | Jadwin et al. | |
| 4,560,635 A | 12/1985 | Hoffend et al. | |
| 4,563,408 A | 1/1986 | Lin et al. | |
| 4,584,253 A | 4/1986 | Lin et al. | |
| 4,858,884 A | 8/1989 | Harwath et al. | |
| 4,935,326 A | 6/1990 | Creatura et al. | |
| 4,937,166 A | 6/1990 | Creatura et al. | |
| 5,227,460 A | 7/1993 | Mahabadi et al. | |
| 5,234,807 A * | 8/1993 | Texter et al. ............. | 430/627 |
| 5,278,020 A | 1/1994 | Grushkin et al. | |
| 5,290,654 A | 3/1994 | Sacripante et al. | |
| 5,308,734 A | 5/1994 | Sacripante et al. | |
| 5,344,738 A | 9/1994 | Kmiecik-Lawrynowicz et al. | |
| 5,346,797 A | 9/1994 | Kmiecik-Lawrynowicz et al. | |
| 5,348,832 A | 9/1994 | Sacripante et al. | |
| 5,364,729 A | 11/1994 | Kmiecik-Lawrynowicz et al. | |
| 5,366,841 A | 11/1994 | Patel et al. | |
| 5,370,963 A | 12/1994 | Patel et al. | |
| 5,403,693 A | 4/1995 | Patel et al. | |
| 5,405,728 A | 4/1995 | Hopper et al. | |
| 5,418,108 A | 5/1995 | Kmiecik-Lawrynowicz et al. | |
| 5,496,676 A | 3/1996 | Croucher et al. | |
| 5,501,935 A | 3/1996 | Patel et al. | |
| 5,527,658 A | 6/1996 | Hopper et al. | |

(Continued)

OTHER PUBLICATIONS

Jachuck et al., "Process Intensification: The Opportunity Presented by Spinning Disc Reactor Technology," Inst. Chem. Eng. Symp. Ser. 1997, vol. 141, pp. 417-424.

*Primary Examiner*—Kelechi C Egwim
(74) *Attorney, Agent, or Firm*—Carter, DeLuca, Farrell & Schmidt, LLP

(57) ABSTRACT

Processes for continuously forming latex emulsions useful in preparing toners are provided.

5 Claims, 3 Drawing Sheets

U.S. PATENT DOCUMENTS

| | | |
|---|---|---|
| 5,585,215 A | 12/1996 | Ong et al. |
| 5,650,255 A | 7/1997 | Ng et al. |
| 5,650,256 A | 7/1997 | Veregin et al. |
| 5,853,943 A | 12/1998 | Cheng et al. |
| 6,004,714 A | 12/1999 | Ciccarelli et al. |
| 6,190,815 B1 | 2/2001 | Ciccarelli et al. |
| 6,403,729 B1 * | 6/2002 | Hergeth et al. ................. 526/68 |
| 2007/0007677 A1 * | 1/2007 | Blair et al. ..................... 264/8 |

* cited by examiner

LATEX EMULSION POLYMERIZATIONS IN SPINNING DISC REACTORS OR ROTATING TUBULAR REACTORS

BACKGROUND

This disclosure relates to processes for preparing latex emulsions. More specifically, continuous processes for emulsion polymerization are described. These processes can be used to produce a latex suitable for use in the preparation of toner compositions.

Processes for forming toner compositions for use with electrostatographic, electrophotographic, or xerographic print or copy devices have been previously disclosed. For example, toners can be prepared by a process that involves emulsion preparation, followed by aggregation and coalescence of the emulsion, washing the resulting product, and then isolating the toner.

Methods of preparing an emulsion aggregation (EA) type toner are known and toners may be formed by aggregating a colorant with a latex polymer formed by batch or semi-continuous emulsion polymerization. For example, U.S. Pat. No. 5,853,943, the disclosure of which is hereby incorporated by reference in its entirety, is directed to a semi-continuous emulsion polymerization process for preparing a latex by first forming a seed polymer. Other examples of emulsion/aggregation/coalescing processes for the preparation of toners are illustrated in U.S. Pat. Nos. 5,290,654, 5,278,020, 5,308,734, 5,370,963, 5,344,738, 5,403,693, 5,418,108, 5,364,729, 5,346,797, and U.S. patent application Ser. No. 11/155,452 filed on Jun. 17, 2005 entitled "Toner Processes", the disclosures of each of which are hereby incorporated by reference in their entirety. Other processes are disclosed in U.S. Pat. Nos. 5,348,832, 5,405,728, 5,366,841, 5,496,676, 5,527,658, 5,585,215, 5,650,255, 5,650,256 and 5,501,935, the disclosures of each of which are hereby incorporated by reference in their entirety.

As noted above, latex polymers utilized in the formation of EA type toners may be formed by batch or semi-continuous emulsion polymerization. Where a batch process is utilized, because the individual batch process involves the handling of bulk amounts of material, each process takes many hours to complete before moving to the next process in the formation of the toner, that is, aggregation and/or coalescence. In addition, batch-to-batch consistency is frequently difficult to achieve because of variations that may arise from one batch to another. While semi-continuous polymerization may reduce the time required to proceed to aggregation and/or coalescence, it still can be difficult to achieve consistency in the product because of variations which can arise from one emulsion to another.

Spinning disc reactors (SDR) are known. The spinning disc concept for reactors attempts to apply process intensification methods within the fields of heat and mass transfer. The technology was developed for heat and mass transfer operations such as heat exchanging, heating, cooling, mixing, blending and the like, for example, as disclosed by Jachuck et al., "Process Intensification: The Opportunity Presented by Spinning Disc Reactor Technology," Inst. Chem. Eng. Symp. Ser. 1997, Vol. 141, pp. 417-424. The technology operates by the use of high gravity fields created by rotation of a disc surface causing fluid introduced to the disc surface at its axis to flow radially outward under the influence of centrifugal acceleration in the form of thin, often wavy, films. Such thin films exhibit excellent heat and mass transfer rates.

It would be advantageous to provide a process for the preparation of a latex resin suitable for use in a toner product that is more efficient, takes less time, and results in a consistent toner product.

SUMMARY

The present disclosure provides processes for preparing an emulsion. The process includes contacting at least one monomer, an optional surfactant and an optional seed resin in at least one reaction vessel selected from the group consisting of spinning disc reactors, rotating tubular reactors, and combinations thereof, maintaining the emulsion under polymerization conditions to provide a latex emulsion containing latex particles and continuously recovering the latex emulsion.

The present disclosure also provides a process for preparing an emulsion by contacting at least one monomer, an optional surfactant and an optional seed resin on at least one spinning disc reactor, maintaining the emulsion under polymerization conditions to provide a latex emulsion containing latex particles, and continuously recovering the latex emulsion.

The present disclosure also provides a process for preparing an emulsion by contacting at least one monomer, an optional surfactant and an optional seed resin in at least one rotating tubular reactor having a length of from about 1 meter to about 10 meters and a tube spinning speed of from about 800 rpm to about 15,000 rpm, maintaining the emulsion under polymerization conditions to provide a latex emulsion containing latex particles, and continuously recovering the latex emulsion.

BRIEF DESCRIPTION OF THE DRAWINGS

Various embodiments of the present disclosure will be described herein below with reference to the figures wherein.

DETAILED DESCRIPTION OF EMBODIMENTS

Processes for making toner compositions in accordance with the present disclosure include a continuous emulsion polymerization process (schematically illustrated in FIGS. 1 and 2) to provide a latex emulsion in one continuous process. At least one spinning disc reactor (SDR) or at least one rotating tubular reactors (RTR) may be utilized in these processes. "At least one" may refer in embodiments, for example, to from about 1 to about 10, in embodiments from about 2 to about 10 in embodiments from about 2 to about 6. The latex emulsion so produced may, in embodiments, be utilized to form a toner composition.

Figure 1:
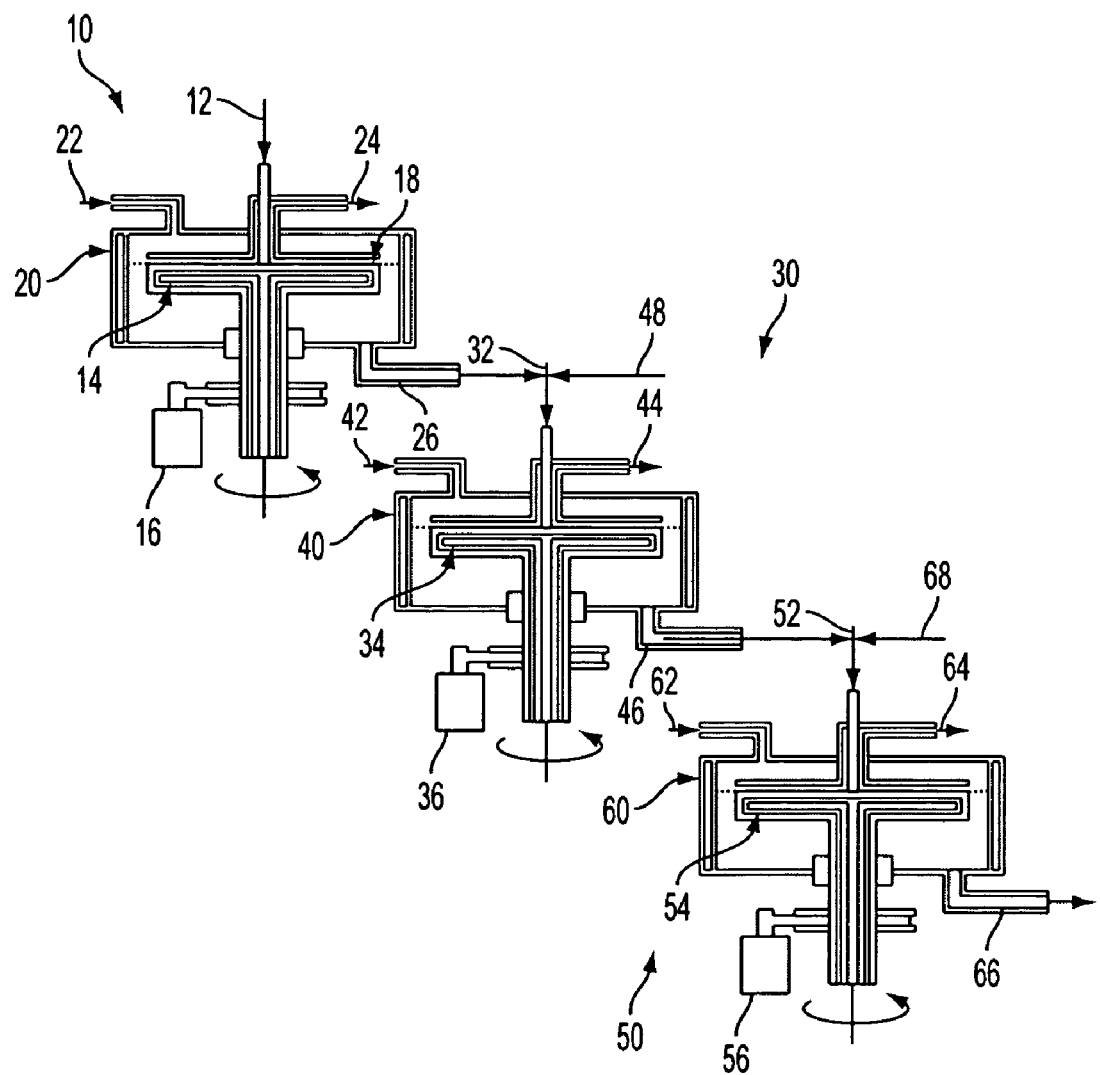
FIG. 1 schematically shows an apparatus suitable for use in connection with a continuous emulsion polymerization process in accordance with embodiments of the present disclosure.

In embodiments, the process of the present disclosure may utilize at least one SDR to produce a latex emulsion in one continuous process. Single or multiple stages of SDRs may be utilized. In embodiments, a series of SDRs may be utilized to produce the latex emulsion. A schematic diagram of an SDR system utilizing more than one SDR is shown in FIG. 1. Such a system can be used for the production of any polymer latex, including a homogeneous latex or a latex possessing structured polymer particles.

In embodiments, the SDR system of FIG. 1 may be utilized to produce a latex emulsion by way of a polycondensation reaction followed by emulsifying the prepared polyester resin into aqueous phase without using any solvent. The process may include three different stages: polycondensation, emulsification and homogenization.

Turning to FIG. 1, preheated liquid reagents or a mixture of reagents can be fed into SDR 10 through one or multiple supply ports 12 to enable reactive reagents and substrates to be mixed in the center of spinning disc 14. The reagents introduced through supply port 12 include any monomer, surfactant, initiator, seed resin, chain transfer agent, crosslinker and the like useful in forming the desired latex.

Disc 14 is rotated by means of an air-driven motor 16 at rotational speeds of up to about 10,000 rpm, in embodiments from about 5,000 to about 10,000 rpm. A thin liquid film 18 is formed on the surface of disc 14 where it experiences very high shear stress, from about 1 $KWm^2K^{-1}$ to about 20 $KWm^2K^{-1}$, in embodiments from about 10 $KWm^2K^{-1}$ to 15 $KWm^2K^{-1}$. This high shear stress also results in very high mass transfer rates between the film/disc and the liquid reagent streams, respectively, from about 2 mole/second to about $20\times10^4$ mole/second, in embodiments from about 3 mole/second to about $15\times10^4$ mole/second.

The top end of the SDR 10 may be connected to a condenser and an inert gas such as nitrogen may flow into the reaction system through inert gas inlet port 22 to prevent oxidation and side reactions and exit through inert gas outlet port 24.

The rotor surface of the disc may be grooved to further enhance mixing by forming numerous surface ripples on the thin film. While discs of the SDR may include grooves which are smooth as depicted in FIG. 3 (FIG. 3 is the top view of a groove on a disc of an SDR or the interior surface of the wall of an RTR), in embodiments the grooves on the disc of an SDR can be designed as a rotor-stator type to further enhance the mixing and shear stress as depicted in FIG. 4 (FIG. 4 is the top view of such a rotor-stator groove on a disc of an SDR or the interior surface of the wall of an RTR).

Figure 3:
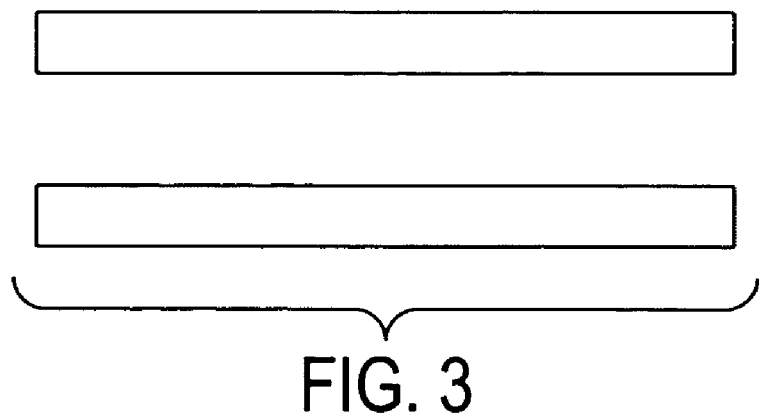
FIG. 3 is a top view of a design for grooves found on the surface of a spinning disc reactor (SDR) or the surface of the inner wall of a rotating tubular reactor (RTR)
Figure 4:
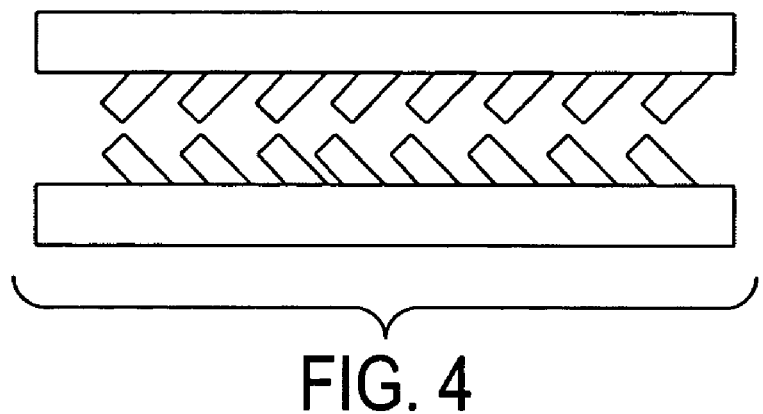
FIG. 4 is a top view of a high shear design for grooves found on the surface of a spinning disc reactor (SDR) or the surface of the inner wall of a rotating tubular reactor (RTR)

As soon as the materials come in contact with the surface of disc 14, a polycondensation reaction begins and rapidly proceeds due to the enhanced heat and mass transfer resulting from the thin films and higher shears provided by these grooves, including those depicted in FIGS. 3 and/or 4, on the disc surface. Water vapor may be easily removed from the melt mixture, which may result in an increase in the rate of polycondensation. A slight vacuum may also be applied to increase the rate of the process.

The molecular weight of the polyester may be controlled by adjusting the rate of polycondensation by controlling the temperature of the reaction with temperature control jacket 20 and removing water during the residence time of the polyester in the SDR 10. Suitable temperatures for the polycondensation stage may be from about 160° C. to about 360° C., in embodiments from about 180° C. to about 300° C., in embodiments from about 200° C. to about 250° C. In practice, the material may reside on the disc of an SDR during polycondensation for a period of time of from about 0.1 seconds to about 5 seconds, in embodiments from about 1 second to about 3 seconds.

In embodiments, the polycondensation reaction stage can be divided into two steps: esterification and polycondensation. In such a case, at the esterification step, reagents may be introduced into an SDR (not shown) for esterification prior to SDR 10. The SDR utilized for esterification may have the same configuration as SDR 10. Suitable reagents introduced through the supply port of the SDR for esterification include any acid, alcohol, diacid, diols, and the like useful in forming the desired polyester.

Where utilized, the esterification reaction should be conducted at a temperature from about 180° C. to about 360° C., in embodiments from about 185° C. to about 300° C., in embodiments from about 200° C. to about 250° C., which can be controlled by a heat transfer fluid in the temperature control jacket of the esterification SDR. This helps remove water generated from the esterification. In practice, the material may reside on the disc of an SDR during optional esterification for a period of time of from about 0.1 second to about 5 seconds, in embodiments from about 1 second to about 3 seconds.

Where an SDR is utilized for the esterification reaction, process materials from the esterification SDR enter SDR 10 for polycondensation. In embodiments, additional reactants, including monomers of the desired polyester, may be introduced into SDR 10 through supply port 12 and the polycondensation reaction proceeds as outlined above.

The end point of the polycondensation reaction can be determined by monitoring the polyester to determine if the desired molecular weight of the polyester has been obtained, which correlates to the melt viscosity or acid value. The molecular weight and molecular weight distribution (MWD) can be measured by Gel Permeation Chromatography (GPC). The molecular weight can be from about 3,000 g/mole to about 45,000 g/mole, in embodiments from about 8,000 g/mole to about 40,000 g/mole, in embodiments from about 10,000 g/mole to about 35,000 g/mole.

Once polycondensation is complete, the process materials leave the SDR 10 via drain pipe 26 and are transferred into the next SDR 30 through supply port 32 for emulsification. SDR 30 may be configured as SDR 10, that is, it may possess spinning disc 34, motor 36, temperature control jacket 40, inert gas inlet port 42, inert gas outlet port 44, and drain pipe 46. Additional reactant may optionally be added through feed stream 48 for introduction into SDR 30 through supply port 32. Suitable reactants include monomers of the desired polyester, surfactants, stabilizers, and the like.

In embodiments, the resin may be mixed with a preheated surfactant aqueous solution which may be pumped into the SDR through feed stream 48 at a controlled rate. The use of preheated surfactant solution pressurized with an inert gas such as nitrogen may reduce the time required for the process and minimize any polyester crystallization. The operation temperature of emulsification should be at least about 20° C. above the polyester melting point to allow for proper flow and sufficient emulsification. Suitable temperatures for emulsification can be from about 80° C. to about 220° C., in embodiments from about 120° C. to about 200° C., in embodiments from about 130° C. to about 160° C. In practice, the material may reside on the disc of an SDR during emulsification for a period of time of from about 0.1 seconds to about 5 seconds, in embodiments from about 1 second to about 3 seconds.

The resulting emulsion may exit SDR 30 through drain pipe 46 and enter into the final SDR 50 through supply port 52 for homogenization at a temperature of from about 80° C. to about 200° C., in embodiments from about 130° C. to about 160° C. An additional aqueous stabilizer solution may be fed into the SDR through supply port 68 at a controlled rate to stabilize the polyester particles. The amount of stabilizer can be from about 0.1 to about 10 percent by weight of the final emulsion composition in embodiments from about 2 to about 8 percent by weight of the final emulsion composition.

SDR 50 is configured as SDR 10 and SDR 30, that is, it possesses spinning disc 54, motor 56, temperature control jacket 60, inert gas inlet port 62, inert gas outlet port 64, and drain pipe 66, through which the final latex may flow.

The size of the resulting polyester particles and the size distribution may be controlled by adjusting the amount of stabilizer and total residence time of the polyester in the various SDRs of the system. An inert gas such as nitrogen may be used to pressurize the system to prevent the aqueous phase from boiling. In practice, the material may reside on the disc of an SDR during homogenization for a period of time of from about 0.1 seconds to about 5 seconds, in embodiments from about 1 second to about 3 seconds.

The desired residence time of material in a given SDR, whether for polycondensation, emulsification, homogenization or optional esterification, can be achieved through the SDR reactor design, including the diameter of the spinning disc and the configuration of grooves thereon, and operation conditions, including the feed rate of reagents and the disc spinning speed. Suitable diameters of the spinning disc(s) of an SDR utilized in accordance with the present disclosure may be from about 8 cm to about 50 cm, in embodiments from about 15 cm to about 30 cm. The spinning speed of disc(s) of an SDR utilized in accordance with the present disclosure may be from about 800 rpm to about 15,000 rpm, in embodiments from about 5,000 rpm to about 10,000 rpm.

Thus, in embodiments polymerization reactions with half-lives in the range of from about 0.01 seconds to about 1 second may be suitable, in embodiments from about 0.1 seconds to about 0.75 seconds. For latex systems, the residence time should be long enough to ensure polymerization is complete but short enough to avoid the premature coalescence.

In embodiments, the multiple SDR configuration depicted in FIG. 1 may also be utilized to form a latex by heterogeneous-phase free radical polymerization. Heterogeneous-phase polymerization refers, in embodiments, for example, to copolymerization by emulsion, dispersion, miniemulsion, or microemulsion polymerization, which results in dispersed polymers possessing varying compositions and morphologies.

The process for heterogeneous-phase polymerization is very similar to the process described above. The reaction in SDR 10 should be conducted at a temperature from about 50° C. to about 90° C., in embodiments from about 60° C. to about 85° C., in embodiments from about 65° C. to about 80° C., which can be controlled by a heat transfer fluid in the temperature control jacket 20 of the SDR. In practice, the material may reside on the disc of SDR 10 during heterogeneous-phase polymerization for a period of time of from about 0.1 second to about 5 seconds, in embodiments from about 1 second to about 3 seconds.

The process materials leave the first SDR 10 via drain pipe 26. The process materials can be transferred into the next SDR 30 where they further polymerize. The number of stages, that is the number of SDRs through which the materials pass, depends on the final target size of the latex particle. During later stages, additional reagents may optionally be fed into an additional SDR, such as SDR 50, through feed stream 68 for introduction into SDR 50 through supply port 52. SDRs (not shown) in addition to SDR 10, 30 and 50 may be present in a multi-stage process. The optional feed reagents can be the same or different as those fed at previous stages of the process, depending on the desired composition of the final latex and its structure. An inert gas such as nitrogen flows into the SDR through inert gas inlet ports 22, 42 and 62 and out through inert gas outlet ports 24, 44 and 64 to create an oxygen free system for the polymerization reaction. In practice, the total residence time in an SDR system of the present disclosure during heterogeneous-phase polymerization may be from about 1 second to about 5 seconds, in embodiments from about 1 second to about 3 seconds.

In embodiments, submicron-size latex polymer particles can be produced using the multi-stage continuous SDR emulsion polymerization process as shown in FIG. 1. Emulsions (monomer(s), aqueous crosslinker, chain transfer agents, surfactants, co-stabilizers, and the like) and initiator may be pumped into SDR 10 at a controlled rate through supply port 12. The rate of introduction of initiator may be from about 0.01 ml/second to about 1 ml/second, in embodiments from about 0.05 ml/second to about 0.5 ml/second.

An inert gas such as nitrogen may be introduced through inert gas inlet port 22 to create an oxygen free system. The latexes produced in SDR 10 can be transferred into next the stage, that is SDR 30, followed by SDR 50, to further grow in size, with more monomer emulsion, the same as introduced in previous stages, fed into the system through supply ports 32 and 52. The desired particle size of the latex can be achieved by controlling the total residence time in the SDR system of the present disclosure. As described above, the total residence time may be adjusted by SDR reactor design and operation conditions. In practice, the total residence time in an SDR system of the present disclosure during polymerization to form submicron-size particles may be from about 1 second to about 5 seconds, in embodiments from about 1 second to about 3 seconds.

Particle size of the submicron-size particles may be from about 100 nm to about 800 nm, in embodiments from about 120 nm to about 600 nm, in embodiments from about 150 nm to about 300 nm. By changing the composition of the monomer solution fed into the various SDRs through supply ports 12, 32, and 52, submicron-size EA composite particles with a core/shell structure can be produced.

In embodiments, micro-size polymer particles can also be produced using the multi-stage continuous SDR dispersion and a free radical polymerization process of the present disclosure. Turning to FIG. 1, a homogenous monomer solution, including monomer, solvent, aqueous, surfactant, chain transfer agent, crosslinker, stabilizer, and initiator may be pumped into SDR 10 through supply port 12 at a controlled rate. An oxygen free system may be achieved by flashing nitrogen gas though the system by way of inert gas inlet port 22 and inert gas outlet port 24. The latexes produced in SDR 10 can be pumped into the next SDR, SDR 30, followed by SDR 50, to further grow in size, with more monomer solution, the same as the previous stages, fed into the system through supply ports 32 and 52.

The desired particle size for the latex can be achieved by controlling the total residence time in the SDR system. As described above, the total residence time may be adjusted by SDR reactor design and operation conditions. In practice, the total residence time in an SDR system of the present disclosure during polymerization to form micro-size polymer may be from about 0.1 second to about 5 seconds, in embodiments from about 1 second to about 3 seconds.

Particle size of the resulting micro-size polymer may be from about 0.6 µm to about 6 µm, in embodiments from about 0.8 µm to about 4 µm, in embodiments from about 1 µm to about 3 µm. By changing the composition of the monomer solution fed into the various SDRs through supply ports 12, 32, and 52, composite micro-size particles with a core/shell structure can be produced.

Nano-size polymer particles can also be produced using the multi-stage SDR process of the present disclosure. As shown in FIG. 1, a miniemulsion or microemulsion, including monomer, surfactant, aqueous, chain transfer agent, crosslinker, costabilizer, and initiator may be pumped into SDR 10 through supply port 12 at a controlled rate. An oxygen free system may be achieved by flashing an inert gas such as nitrogen though the system by way of inert gas inlet port 22 and inert gas outlet port 24. The latexes produce in SDR 10 can be pumped into SDR 30, followed by SDR 50, to further grow in size, with more miniemulsion or microemulsion, the same as the previous stages, fed into the system through supply ports 32 and 52. The desired particle size can be achieved by controlling the total residence time in the SDR system. As described above, the total residence time may be adjusted by SDR reactor design and operation conditions. In practice, the total residence time in an SDR system of the present disclosure during polymerization to form nano-size polymer may be from about 0.1 second to about 5 seconds, in embodiments from about 1 second to about 3 seconds.

Particle size of the nano-size polymer can be from about 20 nm to about 100 nm, in embodiments from about 30 nm to about 80 nm, in embodiments from about 40 nm to about 60 nm. By changing the composition of the miniemulsion or microemulsion fed into the various SDRs through supply ports 12, 32, and 52, composite nanoparticles with a core/shell structure can be produced.

The amount of monomer supplied to the SDRs of the system of the present disclosure via supply ports 12, 32 and/or 52 can be from about 5 to about 60 percent by weight of the final emulsion composition, in embodiments from about 10 to about 50 percent by weight of the final emulsion composition. The amount of surfactant supplied to the SDRs of the system of the present disclosure via supply ports 12, 32 and/or 52 can be from about 0.01 to about 15 percent by weight of the final emulsion composition and, in embodiments, from about 0.1 to about 5 percent by weight of the final emulsion composition. The amount of seed resin supplied to the SDR of the system of the present disclosure via supply ports 12, 32 and/or 52 can be from about 0.1 to about 25 percent by weight of the final emulsion composition, in embodiments of from about 5 to about 20 percent by weight of the final emulsion composition.

In embodiments, an initiator may also be introduced into SDR 10, 30 and/or 50 via supply ports 12, 32 and/or 52, respectively. The amount of initiator can be from about 0.1 to about 8 percent by weight of the final emulsion composition, in embodiments from about 2 to about 6 percent by weight of the final emulsion composition.

The pH of the latex emulsion can be adjusted by the introduction of a pH titration agent into supply ports 12, 32 and/or 52 of SDRs 10, 30 and/or 50, respectively. The amount of pH titration agent introduced can be determined and adjusted automatically in response to a pH reading. The pH may be adjusted to from about 1 to about 5, in embodiments from about 2 to about 4, depending on factors such as the particular monomer employed, the particular initiator chosen and the final desired toner composition.

Figure 2:
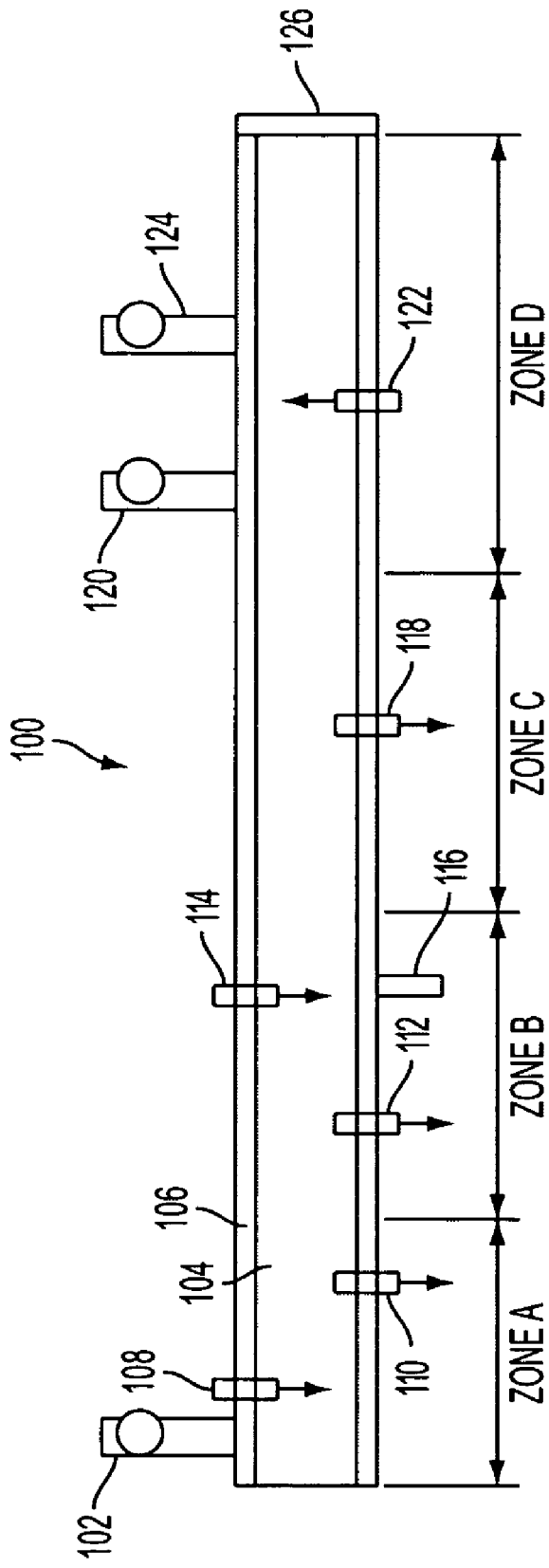
FIG. 2 schematically shows an alternate apparatus suitable for use in connection with a continuous emulsion polymerization process in accordance with embodiments of the present disclosure.

In embodiments, rotating tubular reactors (RTR) may also be utilized to prepare polyester dispersed latex particles in a continuous polymerization and emulsification process. In embodiments, the emulsification process may occur without a solvent. A depiction of an RTR suitable for use in accordance with the present disclosure is set forth in FIG. 2. As depicted in FIG. 2, the RTR 100 permits a complete polyester polymerization and emulsification in one continuous process. The process may include four different stages: esterification, polycondensation, cooling, and an emulsification and homogenization stage.

Turning to FIG. 2, at the esterification step, which occurs in Zone A of RTR 100, a preheated liquid reagent or mixture of reagents can be pumped into RTR 100 through one or multiple supply ports 102 to enable reactive reagents and substrates to be mixed in the rotating tubular reactor. The tube 104 is rotated by means of an air-driven motor (not shown) at rotational speeds up to about 10000 rpm, in embodiments from about 1000 to about 5,000 rpm. A thin liquid film is formed on the tubular reactor wall, where it experiences very high shear stress, which can be adjusted through different configurations of grooves on the interior wall of the RTR, as shown in FIGS. 3 and 4. These configurations, especially the rotor-stator type depicted in FIG. 4, can produce a high shear stress which results in a high heat rate exchange from about 10 $KWm^2K^{-1}$ to about 30 $KWm^2K^{-1}$, in embodiments from 15 $KWm^2K^{-1}$ to 20 $KWm^2K^{-1}$. This high shear stress also results in very high mass transfer rates between the film/tube wall and the liquid reagent streams, respectively. These configurations also further enhance mixing by forming numerous surface ripples on the thin film.

The esterification reaction should be conducted at a temperature from about 180° C. to about 350° C., in embodiments from about 190° C. to about 280° C., in embodiments from about 220° C. to about 250° C., which can be controlled by a heat transfer fluid in the temperature control jacket 106 of the RTR. Heating also aids in the removal of water generated during the esterification. The RTR should be designed to provide local residence times of from about 0.1 second to about 5 seconds in Zone A, in embodiments from about 1.5 seconds to about 3 seconds in Zone A.

The reactor is connected to a condenser (not shown) and nitrogen gas flows into the RTR through inert gas inlet port 108 and out through inert gas outlet port 110.

The process materials leave the esterification stage of the reactor and directly enter into the next section of the RTR, Zone B, for the polycondensation reaction stage. The polycondensation proceeds rapidly due to the enhanced heat and mass transfer achieved because of the thin films and higher shear provided by the grooves on the interior of the tube surface. Water vapor may be easily removed from the melt mixture, which can increase the rate of polycondensation. If necessary, a slight vacuum may be applied with outlet port 112 to increase the rate of the process. Nitrogen gas flows into the reaction system through inert gas inlet port 114 to prevent oxidation and side reactions. Nitrogen gas may also be used to pressurize the system to prevent the aqueous phase from boiling. The pH of the material may be monitored with pH meter 116.

The end point of the polycondensation reaction can be determined by monitoring the polyester to determine if the desired molecular weight of the polyester has been obtained, which correlates to the melt viscosity or acid value. The molecular weight and molecular weight distribution (MWD) can be measured by Gel Permeation Chromatography (GPC). The molecular weight can be in a range of from about 3,000 g/mole to about 45,000 g/mole, in embodiments from about 8,000 g/mole to about 40,000 g/mole, in embodiments from about 10,000 g/mole to about 35,000 g/mole. The desired molecular weight can be achieved by adjusting the rate of the polycondensation reaction through temperature and water removal, with a faster rate obtained with higher temperatures and less water.

Suitable temperatures for the polycondensation stage may be from about 160° C. to about 360° C., in embodiments from about 180° C. to about 300° C., in embodiments from about 200° C. to about 250° C. The RTR should be designed to provide local residence times of from about 0.1 second to about 5 seconds in Zone B, in embodiments from about 1 second to about 3 seconds in Zone B.

After polycondensation is complete the process materials enter the cooling section of the RTR, Zone C in FIG. 2. The temperature of the temperature control jacket 106 of the RTR is reduced to about 100° C. to about 180° C., in embodiments from about 120° C. to about 160° C., in embodiments from about 130° C. to about 140° C. at this stage and remains at this temperature for the emulsification and homogenization stage. Nitrogen gas may leave the RTR through inert gas outlet port 118. The RTR should be designed to provide local residence times of from about 0.1 second to about 5 seconds in Zone C, in embodiments from about 1 second to about 3 seconds in Zone C.

The polyester resin then enters the emulsification and homogenization stage of the RTR, Zone D in FIG. 2, where it may be mixed with a preheated surfactant aqueous solution introduced by pump 120 and pressurized with nitrogen gas introduced through inert gas inlet port 122. A pressurized preheated surfactant may be useful to reduce the time of the process and minimize any polyester crystallization. The operation temperature of emulsification should be at least 20° C. above the polyester melting point to allow the proper flow and enough emulsification. Suitable temperatures can be from about 100° C. to about 200° C., in embodiments from about 120° C. to about 190° C., in embodiments from about 130° C. to about 160° C. The RTR should be designed to provide local residence times of from about 0.1 seconds to about 5 seconds in Zone D, in embodiments from about 1 second to about 3 seconds in Zone D.

Figure 5:
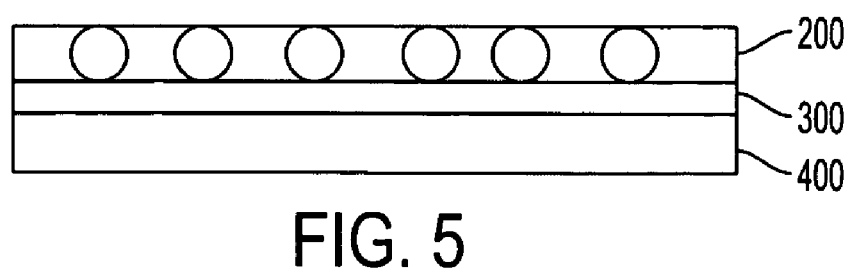
FIG. 5 is a graphic depiction of the final particle shape for a dispersion in accordance with the present disclosure at the end of formation of the emulsion and homogenization.

An additional aqueous stabilizer solution may be fed into the RTR by way of supply port 124 at controlled rate to stabilize the polyester latex particles for homogenization. Adjusting the amount of stabilizer and total residence time will influence the size of the final polyester particle and size distribution. In embodiments, the resin formed on the inside of the RTR may be as set forth in FIG. 5, with product 200 formed on the tube wall 400 and the aqueous stabilizer solution forming layer 300 between product 200 and tube wall 400.

The local residence time in each of Zones A, B, C and D can be controlled by RTR reactor design, including the length and diameter of the tube and the configuration of grooves on the interior surface thereof, as well as operating conditions including temperature, the spinning speed of the tube, and the feed rate of the reactants. Suitable tube lengths for RTR(s) utilized in accordance with the present disclosure may be from about 1 meter to about 10 meters, in embodiments from about 2 meters to about 5 meters. Suitable inner diameters of a tube of an RTR may be from about 8 cm to about 50 cm, in embodiments from about 15 cm to about 30 cm. The spinning speed of the tube(s) of an RTR utilized in accordance with the present disclosure may be from about 800 rpm to about 15,000 rpm, in embodiments from about 3000 rpm to about 10,000 rpm.

The final emulsion (which includes, in embodiments, "latex") exits the RTR through drain 126. It may, in embodiments, be combined with a colorant and subjected to aggregation/coalescence/washing to produce a toner.

While the above description describes a single RTR with four zones, including an esterification zone, in embodiments an RTR for use in accordance with the present disclosure may only include a polycondensation zone, a cooling zone, and an emulsification and homogenization zone. In such a case, esterification does not occur in the RTR and the starting materials introduced into the RTR include monomer, optional surfactant, optional initiator and optional seed resin and the polycondensation reaction is the first reaction that occurs in the RTR.

Moreover, while the above description has detailed a series of SDRs or a single RTR, other system configurations may be utilized in accordance with the present disclosure. For example, a single SDR could be utilized to form a latex, multiple RTRs could be utilized to form a latex, or a combination of at least one SDR and at least one RTR could be utilized to form a latex.

Any monomer suitable for preparing a latex emulsion can be used in the present processes. Suitable monomers useful in forming the latex emulsion, and thus the resulting latex particles in the latex emulsion include, but are not limited to, styrenes, acrylates, methacrylates, butadienes, isoprenes, acrylic acids, methacrylic acids, acrylonitriles, mixtures thereof, and the like. Any seed resin employed may be selected depending upon the particular latex polymer to be made in the emulsion polymerization process. In embodiments, the optional seed resin includes the latex particles being produced.

In embodiments, the resin of the latex may include at least one polymer. In embodiments, at least one is from about one to about twenty and, in embodiments, from about three to about ten. Exemplary polymers includes styrene acrylates, styrene butadienes, styrene methacrylates, and more specifically, poly(styrene-alkyl acrylate), poly(styrene-1,3-diene), poly(styrene-alkyl methacrylate), poly (styrene-alkyl acrylate-acrylic acid), poly(styrene-1,3-diene-acrylic acid), poly (styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly (styrene-1,3-diene-acrylonitrile-acrylic acid), poly(alkyl acrylate-acrylonitrile-acrylic acid), poly(styrene-butadiene), poly(methylstyrene-butadiene), poly(methyl methacrylate-butadiene), poly(ethyl methacrylate-butadiene), poly(propyl methacrylate-butadiene), poly (butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly (styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), poly(styrene-butyl acrylate-acrylonitrile-acrylic acid), poly (styrene-butadiene), poly(styrene-isoprene), poly(styrene-butyl methacrylate), poly(styrene-butyl acrylate-acrylic acid), poly(styrene-butyl methacrylate-acrylic acid), poly (butyl methacrylate-butyl acrylate), poly(butyl methacrylate-acrylic acid), poly(acrylonitrile-butyl acrylate-acrylic acid), and mixtures thereof. The polymer may be block, random, or alternating copolymers. In addition, polyester resins obtained from the reaction of bisphenol A and propylene oxide or propylene carbonate, and in particular including such polyesters followed by the reaction of the resulting product with fumaric acid (as disclosed in U.S. Pat. No. 5,227,460, the entire disclosure of which is incorporated herein by reference), and branched polyester resins resulting from the reaction of dimethylterephthalate with 1,3-butanediol, 1,2-propanediol, and pentaerythritol may also be used.

In embodiments, an amorphous polyester resin, for example a polypropoxylated bisphenol A fumarate polyester, may be prepared in the continuous process of the present disclosure and then utilized to form a toner composition. Bisphenol A, propylene oxide or propylene carbonate and fumaric acid would be utilized as monomeric components in the process of the present disclosure while a propoxylated bisphenol A fumarate may be utilized as a seed resin to facilitate formation of the latex. A linear propoxylated bisphenol A fumarate resin which may be utilized as a seed resin is available under the trade name SPARII from Resana S/A Industrias Quimicas, Sao Paulo Brazil. Other propoxylated bisphenol a fumarate resins that are commercially available include GTUF and FPESL-2 from Kao Corporation, Japan, and EM181635 from Reichhold, Research Triangle Park, N.C. and the like.

Examples of initiators which may be added in preparing the latex include water soluble initiators, such as ammonium and potassium persulfates, and organic soluble initiators including peroxides and hydroperoxides including Vazo peroxides, such as VAZO 64™, 2-methyl 2-2'-azobis propanenitrile, VAZO 88™, and 2-2'- azobis isobutyramide dehydrate and mixtures thereof. In embodiments chain transfer agents may be utilized including dodecane thiol, octane thiol, carbon tetrabromide, mixtures thereof, and the like. The amount of initiator can be from about 0.1 to about 8 percent by weight of the final emulsion composition, in embodiments from about 2 to about 6 percent by weight of the final emulsion composition.

Surfactants which may be utilized in preparing latexes with the processes of the present disclosure include ionic and/or nonionic surfactants. Anionic surfactants which may be utilized include sulfates and sulfonates, sodium dodecylsulfate (SDS), sodium dodecylbenzene sulfonate, sodium dodecyinaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, mixtures thereof, and the like.

Examples of nonionic surfactants include, but are not limited to alcohols, acids and ethers, for example, polyvinyl alcohol, polyacrylic acid, methalose, methyl cellulose, ethyl cellulose, propyl cellulose, hydroxyl ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, mixtures thereof, and the like. In embodiments commercially available surfactants from Rhone-Poulenc such as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™ can be selected.

Examples of cationic surfactants include, but are not limited to, ammoniums, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, and C12, C15, C17 trimethyl ammonium bromides, mixtures thereof, and the like. Other cationic surfactants include cetyl pyridinium bromide, halide salts of quaternized polyoxyethylalkylamines, dodecylbenzyl triethyl ammonium chloride, and the like, and mixtures thereof. The choice of particular surfactants or combinations thereof as well as the amounts of each to be used are within the purview of those skilled in the art.

In embodiments, two or more of the water, surfactant, monomer, seed resin, chain transfer agent, and/or crosslinker may be pre-mixed prior to introduction into a reactor. For example, a surfactant may be pre-mixed with monomer and introduced into an SDR or an RTR. As another example, a seed resin may be pre-mixed with surfactant and introduced into the SDR or RTR simultaneously with the monomer. Any other suitable combinations may be utilized. Additionally, at least one monomer may be utilized in forming the resin; in embodiments from about 2 to about 10 monomers may be utilized.

In embodiments, the latex of the present disclosure may be combined with a colorant to produce a toner by processes within the purview of those skilled in the art. Colorants include pigments, dyes, mixtures of pigments and dyes, mixtures of pigments, mixtures of dyes, and the like. The colorant may be, for example, carbon black, cyan, yellow, magenta, red, orange, brown, green, blue, violet or mixtures thereof.

In embodiments wherein the colorant is a pigment, the pigment may be, for example, carbon black, phthalocyanines, quinacridones or RHODAMINE B™ type, red, green, orange, brown, violet, yellow, fluorescent colorants and the like.

The colorant may be present in the toner of the disclosure in an amount of from about 1 to about 25 percent by weight of toner, in embodiments in an amount of from about 2 to about 15 percent by weight of the toner.

Exemplary colorants include carbon black like REGAL 330™ magnetites; Mobay magnetites including MO8029™, MO8060™; Columbian magnetites; MAPICO BLACKS™ and surface treated magnetites; Pfizer magnetites including CB4799™, CB5300™, CB5600™, MCX6369™; Bayer magnetites including, BAYFERROX 8600™, 8610™; Northern Pigments magnetites including, NP-604™, NP-608™; Magnox magnetites including TMB-100™, or TMB-104™, HELIOGEN BLUE L6900™, D6840™, D7080™, D7020™, PYLAM OIL BLUE™, PYLAM OIL YELLOW™, PIGMENT BLUE 1™ available from Paul Uhlich and Company, Inc.; PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario; NOVAPERM YELLOW FGL™, HOSTAPERM PINK E™ from Hoechst; and CINQUASIA MAGENTA™ available from E.I. DuPont de Nemours and Company. Other colorants include 2,9-dimethyl-substituted quinacridone and anthraquinone dye identified in the Color Index as CI 60710, CI Dispersed Red 15, diazo dye identified in the Color Index as CI 26050, CI Solvent Red 19, CI 12466, also known as Pigment Red 269, CI 12516, also known as Pigment Red 185, copper tetra(octadecyl sulfonamido) phthalocyanine, x-copper phthalocyanine pigment listed in the Color Index as CI 74160, CI Pigment Blue, Anthrathrene Blue identified in the Color Index as CI 69810, Special Blue X-2137, diarylide yellow 3,3-dichlorobenzidene acetoacetanilides, a monoazo pigment identified in the Color Index as CI 12700, CI Solvent Yellow 16, CI Pigment Yellow 74, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Yellow 180 and Permanent Yellow FGL. Organic soluble dyes having a high purity for the purpose of color gamut which may be utilized include Neopen Yellow 075, Neopen Yellow 159, Neopen Orange 252, Neopen Red 336, Neopen Red 335, Neopen Red 366, Neopen Blue 808, Neopen Black X53, Neopen Black X55, wherein the dyes are selected in various suitable amounts, for example from about 0.5 to about 20 percent by weight, in embodiments, from about 5 to about 20 weight percent of the toner.

Wax dispersions may also be added to toners of the present disclosure. Suitable waxes include, for example, submicron wax particles in the size range of from about 50 to about 500 nanometers, in embodiments of from about 100 to about 400 nanometers in volume average diameter, suspended in an aqueous phase of water and an ionic surfactant, nonionic surfactant, or mixtures thereof. The ionic surfactant or nonionic surfactant may be present in an amount of from about 0.5 to about 10 percent by weight, and in embodiments of from about 1 to about 5 percent by weight of the wax.

The wax dispersion according to embodiments of the present disclosure includes a wax for example, a natural vegetable wax, natural animal wax, mineral wax and/or synthetic wax. Examples of natural vegetable waxes include, for example, carnauba wax, candelilla wax, Japan wax, and bayberry wax. Examples of natural animal waxes include, for example, beeswax, punic wax, lanolin, lac wax, shellac wax, and spermaceti wax. Mineral waxes include, for example, paraffin wax, microcrystalline wax, montan wax, ozokerite wax, ceresin wax, petrolatum wax, and petroleum wax. Synthetic waxes of the present disclosure include, for example, Fischer-Tropsch wax, acrylate wax, fatty acid amide wax, silicone wax, polytetrafluoroethylene wax, polyethylene wax, polypropylene wax, and mixtures thereof.

Examples of polypropylene and polyethylene waxes include those commercially available from Allied Chemical and Baker Petrolite, wax emulsions available from Michelman Inc. and the Daniels Products Company, EPOLENE N-15 commercially available from Eastman Chemical Products, Inc., Viscol 550-P, a low weight average molecular weight polypropylene available from Sanyo Kasel K.K., and similar materials. In embodiments, commercially available polyethylene waxes possess a molecular weight (Mw) of from about 1,000 to about 1,500, and in embodiments of from about 1,250 to about 1,400, while the commercially available polypropylene waxes have a molecular weight of from about 4,000 to about 5,000, and in embodiments of from about 4,250 to about 4,750.

In embodiments, the waxes may be functionalized. Examples of groups added to functionalize waxes include amines, amides, imides, esters, quaternary amines, and/or carboxylic acids. In embodiments, the functionalized waxes may be acrylic polymer emulsions, for example, Joncryl 74, 89, 130, 537, and 538, all available from Johnson Diversey, Inc, or chlorinated polypropylenes and polyethylenes commercially available from Allied Chemical and Petrolite Corporation and Johnson Diversey, Inc.

The wax may be present in an amount of from about 1 to about 30 percent by weight, and in embodiments from about 2 to about 20 percent by weight of the toner.

The mixture of latex, colorant and optional wax is subsequently coalesced. Coalescing may include stirring and heating at a temperature of from about 90° C. to about 99° C., for a period of from about 0.5 to about 6 hours, and in embodiments from about 2 to about 5 hours. Coalescing may be accelerated by additional stirring.

The pH of the mixture is then lowered to from about 3.5 to about 6 and in embodiments, to from about 3.7 to about 5.5 with, for example, an acid to coalesce the toner aggregates. Suitable acids include, for example, nitric acid, sulfuric acid, hydrochloric acid, citric acid or acetic acid. The amount of acid added may be from about 4 to about 30 percent by weight of the mixture, and in embodiments from about 5 to about 15 percent by weight of the mixture.

The mixture is cooled, washed and dried. Cooling may be at a temperature of from about 20° C. to about 40° C., in embodiments from about 22° C. to about 30° C. over a period time from about 1 hour to about 8 hours, and in embodiments from about 1.5 hours to about 5 hours.

In embodiments, cooling a coalesced toner slurry includes quenching by adding a cooling media such as, for example, ice, dry ice and the like, to effect rapid cooling to a temperature of from about 20° C. to about 40° C., and in embodiments of from about 22° C. to about 30° C. Quenching may be feasible for small quantities of toner, such as, for example, less than about 2 liters, in embodiments from about 0.1 liters to about 1.5 liters. For larger scale processes, such as for example greater than about 10 liters in size, rapid cooling of the toner mixture is not feasible nor practical, neither by the introduction of a cooling medium into the toner mixture, nor by the use of jacketed reactor cooling.

The washing may be carried out at a pH of from about 7 to about 12, and in embodiments at a pH of from about 9 to about 11. The washing is at a temperature of from about 45° C. to about 70° C., and in embodiments from about 50° C. to about 67° C. The washing may include filtering and reslurrying a filter cake including toner particles in deionized water. The filter cake may be washed one or more times by deionized water, or washed by a single deionized water wash at a pH of about 4 wherein the pH of the slurry is adjusted with an acid, and followed optionally by one or more deionized water washes.

Drying may be carried out at a temperature of from about 35° C. to about 75° C., and in embodiments of from about 45° C. to about 60° C. The drying may be continued until the moisture level of the particles is below a set target of about 1% by weight, in embodiments of less than about 0.7% by weight.

Any aggregating agent capable of causing complexation might be used in forming toner of the present disclosure. Both alkali earth metal or transition metal salts can be utilized as aggregating agents. In embodiments, alkali (II) salts can be selected to aggregate sodio sulfonated polyester colloids with a colorant to enable the formation of a toner composite. Such salts include, for example, beryllium chloride, beryllium bromide, beryllium iodide, beryllium acetate, beryllium sulfate, magnesium chloride, magnesium bromide, magnesium iodide, magnesium acetate, magnesium sulfate, calcium chloride, calcium bromide, calcium iodide, calcium acetate, calcium sulfate, strontium chloride, strontium bromide, strontium iodide, strontium acetate, strontium sulfate, barium chloride, barium bromide, barium iodide, and optionally mixtures thereof. Examples of transition metal salts or anions which may be utilized as aggregating agent include acetates of vanadium, niobium, tantalum, chromium, molybdenum, tungsten, manganese, iron, ruthenium, cobalt, nickel, copper, zinc, cadmium or silver; acetoacetates of vanadium, niobium, tantalum, chromium, molybdenum, tungsten, manganese, iron, ruthenium, cobalt, nickel, copper, zinc, cadmium or silver; sulfates of vanadium, niobium, tantalum, chromium, molybdenum, tungsten, manganese, iron, ruthenium, cobalt, nickel, copper, zinc, cadmium or silver; and aluminum salts such as aluminum acetate, aluminum halides such as polyaluminum chloride, mixtures thereof, and the like.

Stabilizers that may be utilized in the present continuous processes include bases such as metal hydroxides, including sodium hydroxide, potassium hydroxide, ammonium hydroxide, and optionally mixtures thereof. Also useful as a stabilizer is a composition containing sodium silicate dissolved in sodium hydroxide.

In order to aid in the processing of the toner composition, an ionic coagulant having an opposite polarity to the ionic surfactant in the latex (i.e., a counterionic coagulant) may optionally be used in the toner composition. The quantity of coagulant is present to, for example, prevent/minimize the appearance of fines in the final slurry. Fines refers, in embodiments, for example, to small sized particles of less than about 6 microns in average volume diameter, in embodiments from about 2 microns to about 5 microns in average volume diameter, which fines can adversely affect toner yield. Counterionic coagulants may be organic or inorganic entities. Exemplary coagulants that can be included in the toner include polymetal halides, polymetal sulfosilicates, monovalent, divalent or multivalent salts optionally in combination with cationic surfactants, mixtures thereof, and the like. Inorganic cationic coagulants include, for example, polyaluminum chloride (PAC), polyaluminum sulfo silicate (PASS), aluminum sulfate, zinc sulfate, or magnesium sulfate. For example, in embodiments the ionic surfactant of the resin latex dispersion can be an anionic surfactant, and the counterionic coagulant can be a polymetal halide or a polymetal sulfo silicate. When present, the coagulant is used in an amount from about 0.02 to about 2 percent by weight of the total toner composition, in embodiments from about 0.1 to about 1.5 percent by weight of the total toner composition.

The toner may also include any known charge additives in amounts of from about 0.1 to about 10 weight percent, and in embodiments of from about 0.5 to about 7 weight percent of the toner. Examples of such charge additives include alkyl pyridinium halides, bisulfates, the charge control additives of U.S. Pat. Nos. 3,944,493, 4,007,293, 4,079,014, 4,394,430 and 4,560,635, the disclosures of each of which are hereby incorporated by reference in their entirety, negative charge enhancing additives like aluminum complexes, and the like.

Surface additives can be added to the toner after washing or drying. Examples of such surface additives include, for example, metal salts, metal salts of fatty acids, colloidal silicas, metal oxides, strontium titanates, mixtures thereof, and the like. Surface additives may be present in an amount of from about 0.1 to about 10 weight percent, and in embodiments of from about 0.5 to about 7 weight percent of the toner. Example of such additives include those disclosed in U.S. Pat. Nos. 3,590,000, 3,720,617, 3,655,374 and 3,983,045, the disclosures of each of which are hereby incorporated by reference in their entirety. Other additives include zinc stearate and AEROSIL R972® available from Degussa. The coated silicas of U.S. Pat. Nos. 6,190,815 and 6,004,714, the disclosures of each of which are hereby incorporated by reference in their entirety, can also be present in an amount of from about 0.05 to about 5 percent, and in embodiments of from about 0.1 to about 2 percent of the toner, which additives can be added during the aggregation or blended into the formed toner product.

Toner in accordance with the present disclosure can be used in a variety of imaging devices including printers, copy machines, and the like. The toners generated in accordance with the present disclosure are excellent for imaging processes, especially xerographic processes and are capable of providing high quality colored images with excellent image resolution, acceptable signal-to-noise ratio, and image uniformity. Further, toners of the present disclosure can be selected for electrophotographic imaging and printing processes such as digital imaging systems and processes.

Toner particles produced utilizing a latex of the present disclosure may have a size of about 1 micron to about 20 microns, in embodiments about 2 microns to about 15 microns, in embodiments about 3 microns to about 7 microns.

Developer compositions can be prepared by mixing the toners obtained with the processes disclosed herein with known carrier particles, including coated carriers, such as steel, ferrites, and the like. Such carriers include those disclosed in U.S. Pat. Nos. 4,937,166 and 4,935,326, the entire disclosures of each of which are incorporated herein by reference. The carriers may be present from about 2 percent by weight of the toner to about 8 percent by weight of the toner, in embodiments from about 4 percent by weight to about 6 percent by weight of the toner. The carrier particles can also include a core with a polymer coating thereover, such as polymethylmethacrylate (PMMA), having dispersed therein a conductive component like conductive carbon black. Carrier coatings include silicone resins such as methyl silsesquioxanes, fluoropolymers such as polyvinylidiene fluoride, mixtures of resins not in close proximity in the triboelectric series such as polyvinylidiene fluoride and acrylics, thermosetting resins such as acrylics, mixtures thereof and other known components.

Imaging methods are also envisioned with the toners disclosed herein. Such methods include, for example, some of the above patents mentioned above and U.S. Pat. Nos. 4,265,990, 4,858,884, 4,584,253 and 4,563,408, the entire disclosures of each of which are incorporated herein by reference. The imaging process includes the generation of an image in an electronic printing magnetic image character recognition apparatus and thereafter developing the image with a toner composition of the present disclosure. The formation and development of images on the surface of photoconductive materials by electrostatic means is well known. The basic xerographic process involves placing a uniform electrostatic charge on a photoconductive insulating layer, exposing the layer to a light and shadow image to dissipate the charge on the areas of the layer exposed to the light, and developing the resulting latent electrostatic image by depositing on the image a finely-divided electroscopic material, for example, toner. The toner will normally be attracted to those areas of the layer, which retain a charge, thereby forming a toner image corresponding to the latent electrostatic image. This powder image may then be transferred to a support surface such as paper. The transferred image may subsequently be permanently affixed to the support surface by heat. Instead of latent image formation by uniformly charging the photoconductive layer and then exposing the layer to a light and shadow image, one may form the latent image by directly charging the layer in image configuration. Thereafter, the powder image may be fixed to the photoconductive layer, eliminating the powder image transfer. Other suitable fixing means such as solvent or overcoating treatment may be substituted for the foregoing heat fixing step.

Advantages of the continuous processes of the present disclosure include: (1) it is less labor intense; (2) it allows for more precise process control and product quality control; (3) it allows for easy scale-out rather than scale-up, since it does not require large quantities of material necessary for conventional reactor processes; (4) it is more energy efficient and produces less waste; (5) it is simple and can reduce the capital investment required to prepare latex as well as the lead times for commercialization; (6) it can increase productivity and reduce unit manufacturing cost (UMC); (7) it is able to provide different types of particles having varying compositions and morphologies; (8) it can reduce the time necessary to produce the latex; and (9) it may, in embodiments, allow for in situ emulsifying polyester without solvent.

The following example illustrates embodiments of the present disclosure. The example is intended to be illustrative only and is not intended to limit the scope of the present disclosure. Also, parts and percentages are by weight unless otherwise indicated.

EXAMPLES

Example 1

Submicron-sized Latex Preparation utilizing a spinning disc reactor. A latex emulsion including polymer particles in a range of about 100 nm to about 500 nm may be generated from the emulsion polymerization of styrene, butyl acrylate and beta carboxyl ethyl acrylate (β CEA) using a multi-stage SDR as follows.

First, a monomer emulsion is prepared as follows. About 440 grams of styrene, about 98 grams of butyl acrylate, about 16.2 grams of β CEA, about 7 grams of 1-dodecanethiol, about 1.8 grams of dodecanediol diacrylate (ADOD), about 9.6 grams of DOWFAX™ (anionic surfactant), and about 770 grams of deionized water are mixed to form an emulsion in a stainless steel holding tank. The holding tank is purged with nitrogen for about 10 minutes before introduction into a spinning disc reactor. Separately, about 5.4 grams of ammonium persulfate initiator is dissolved in about 95 grams of deionized water to form an initiator solution.

The emulsion and initiator solution are fed via two separate streams using metering pumps into the spinning disc reactor. The diameter of the disc is about 15 cm to about 25 cm. The temperature of the reactor is maintained at about 80° C., and the rotational speed is about 5,000 rpm. The feeding rate of monomer emulsion is from about 0.05 to about 20 ml/second, typically about 2 ml/second, and the feeding rate of the initiator solution is about 0.2 ml/second. The residence time of these materials in the spinning disc reactor is about 1 to about 5 seconds.

The final latex, which includes styrene, butyl acrylate and β CEA at a ratio of about 81.7:18.3:3 pph respectively, has a size of about 200 nm. The latex has a $M_w$ of about 34,500, and a $M_n$ of about 11,400 as measured by gel permeation chromatography (GPC), and the onset Tg is about 59.8° C. as measured by differential scanning calorimetry ("DSC").

Example 2

Micro-size Dispersion Latex Preparation/SDR Method. A latex emulsion including polymer particles in a range of about 800 mn to about 10,000 nm may be generated from the dispersion polymerization of methyl methacrylate (MMA) using a multi-stage SDR as follows.

First, a monomer solution is prepared as follows. About 150 grams of MMA, about 85 grams of methanol/water (at a ratio of about 70:30 methanol:water), and about 1 gram of stabilizer PVP-K30 (a poly(vinylpyrrolidone), 40,000 g/mole, are mixed to form a homogenous solution in a stainless steel holding tank. The holding tank is then purged with nitrogen for about 10 minutes before feeding into the reactor using metering pumps. Separately, about 0.3 grams AIBN (2,2'-azobis(isobutyroinitile)), initiator is dissolved in about 20 grams of methanol/water (at a ratio of about 70:30 methanol:water) to form an initiator solution.

The monomer solution and initiator solution are then fed via two separate streams using metering pumps into a spinning disc reactor. The diameter of the disc is in the range of about 15 to about 25 cm. The temperature of the reactor is maintained at about 70° C., and the rotational speed is about 5,000 rpm. The feeding rate of monomer emulsion is about 2 ml/second, and the feeding rate of the initiator solution is about 0.2 ml/second.

The final poly(methyl methacrylate) latex obtained from the reactor has a size of about 2,000 nm with an $M_w$ of about 550,00 as measured by GPC.

Example 3

Submicron-size EA toner Polyester Latex Preparation/Multi-stage SDR Method. A polycondensation reaction occurs first in a polycondensation stage which, in turn, can be divided into two steps: esterification and polycondensation. At the esterification step, sebacic acid, ethylene glycol and a dipropylene glycol are mixed at a molar ratio of 1:2:2 in a stainless steel reactor. The mixture is heated to about 120° C. The preheated mixture is then fed into a stainless steel SDR at a rate of about 40 ml/second using a metering pump. The diameter of the disc in the SDR is about 30 to about 40 cm. The rotational speed of the disc is about 500 to about 1000 rpm. The temperature of the reactor is maintained at about 200° C. to about 250° C. Nitrogen gas flows into the reaction system through a side opening during the whole reaction. The materials obtain a residence time on the disc of about 3 seconds to about 5 seconds.

The process materials leave the SDR reactor via two drain pipes and are directly transferred into a second SDR for the polycondensation reaction. The disc in the second SDR has the same diameter as the esterification SDR. The rotational speed of the SDR is between about 500 and about 1000 rpm. The temperature is held at about 250° C., with nitrogen flashed into the reaction system to prevent oxidation and other side reactions.

Emulsification and Homogenization Stage. The melt polyester resin prepared after the polycondensation reaction in the second SDR above is pumped into an emulsification SDR, where it is mixed with preheated (80° C.) DOWFAX™ surfactant aqueous solution (about 1.5 weight percent) pumped in at a rate of about 80 ml/second. The temperature is maintained at about 140° C. to about 160° C. The spinning speed of the disc of the emulsification SDR is about 1000 rpm. A residence time of about 5 seconds in the emulsification is achieved. Nitrogen gas is used to pressurize the system to prevent the aqueous phase from boiling. The polyester latex has a particle size of about 600 to about 1000 nm, and a molecular weight of about 5 to about 10 kg/mole.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A process comprising:
   preparing an emulsion comprising at least one monomer, an optional surfactant and an optional seed resin on from about 2 to about 6 spinning disc reactors;
   maintaining the emulsion under polymerization conditions comprising a polycondensation reaction occurring on a first spinning disc reactor, and an emulsification process occurring on a second spinning disc reactor, to provide a latex emulsion containing latex particles; and continuously recovering the latex emulsion.

2. A process as in claim 1, wherein the at least one monomer comprises from about 2 to about 10 monomers, the at least one monomer is selected from the group consisting of styrenes, acrylates, methacrylates, butadienes, isoprenes, acrylic acids, methacrylic acids, and acrylonitriles, the optional seed resin comprises the latex particles being produced, and wherein the emulsion polymerization optionally comprises a free radical polymerization reaction which occurs at a temperature from about 50° C. to about 90° C.

3. A process as in claim 1, wherein the latex particles are selected from the group consisting of poly(styrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-butylacrylate), poly(styrene-butadiene), poly(styrene-isoprene), poly(styrene-butyl methacrylate), poly(styrene-butyl acrylate-acrylic acid), poly(styrene-butadiene-acrylic acid), poly(styrene-isoprene-acrylic acid), poly(styrene-butyl methacrylate-acrylic acid), poly(butyl methacrylate-butyl acrylate), poly(butyl methacrylate-acrylic acid), poly(styrene-butyl acrylate-acrylonitrile-acrylic acid), and poly(acrylonitrile-butyl acrylate-acrylic acid), and the optional surfactant is selected from the group consisting of anionic sulfate surfactants, anionic sulfonate surfactants, anionic acid surfactants, nonionic alcohol surfactants, nonionic acid surfactants, nonionic ether surfactants, cationic ammonium surfactants, and cationic halide salts of quaternized polyoxyethylalkylamine surfactants.

4. A process as in claim 1, wherein the optional surfactant is selected from the group consisting of sodium dodecylsulfate, sodium dodecylbenzene sulfonates, sodium dodecylnaphthalene sulfate, dialkyl benzenealkyl sulfates, dialkyl benzenealkyl sulfonates, abitic acid, polyvinyl alcohol, polyacrylic acid, methalose, methyl cellulose, ethyl cellulose, propyl cellulose, hydroxyl ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, C12 trimethyl ammonium bromide, C15 trimethyl ammonium bromide, C17 trimethyl ammonium bromide, dodecylbenzyl triethyl ammonium chloride, cetyl pyridinium bromide, and optionally mixtures thereof.

5. A process as in claim 1, wherein the from about 2 to about 6 spinning disc reactors have a diameter of from about 8 cm to about 50 cm and a disc spinning speed of from about 800 rpm to about 15,000 rpm.

* * * * *